US012798178B2

(12) United States Patent
Discekici et al.

(10) Patent No.: US 12,798,178 B2
(45) Date of Patent: Nov. 17, 2026

(54) THREE-DIMENSIONAL PRINTING OF HYDROGELS

(71) Applicant: PERIDOT PRINT LLC, Palo Alto, CA (US)

(72) Inventors: Emre Hiro Discekici, San Diego, CA (US); Shannon Reuben Woodruff, San Diego, CA (US); Graciela Emma Negri Jimenez, San Diego, CA (US); Carolin Fleischmann, San Diego, CA (US); Jacob Wright, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 469 days.

(21) Appl. No.: 17/997,164

(22) PCT Filed: Apr. 30, 2020

(86) PCT No.: PCT/US2020/030635
§ 371 (c)(1),
(2) Date: Oct. 26, 2022

(87) PCT Pub. No.: WO2021/221645
PCT Pub. Date: Nov. 4, 2021

(65) Prior Publication Data
US 2023/0219291 A1 Jul. 13, 2023

(51) Int. Cl.
*B29C 64/165* (2017.01)
*B33Y 10/00* (2015.01)
(Continued)

(52) U.S. Cl.
CPC ............ *B29C 64/165* (2017.08); *B33Y 10/00* (2014.12); *B33Y 70/00* (2014.12); *C09D 11/023* (2013.01);
(Continued)

(58) Field of Classification Search
CPC .............................. B29C 64/165; B33Y 70/00
See application file for complete search history.

(56) References Cited

U.S. PATENT DOCUMENTS 9,872,935 B2 1/2018 Bennett et al.
10,449,739 B2 10/2019 Qiu et al.
(Continued)

FOREIGN PATENT DOCUMENTS

JP 2019-085521 A 6/2019

OTHER PUBLICATIONS

Nurly, H., et al., "Effect of carbon nanotubes reinforcement on the polyvinyl alcohol—polyethylene glycol double-network hydrogel composites: A general approach to shape memory and printability", European Polymer Journal , 2019, vol. 110, pp. 114-122.

*Primary Examiner* — Alison L Hindenlang
*Assistant Examiner* — Alexander A Wang
(74) *Attorney, Agent, or Firm* — Dierker & Kavanaugh, P.C.

(57) ABSTRACT

Hydrogel three-dimensional printing kits, methods of three-dimensional printing and three-dimensional printed hydrogels are described. In one example, a three-dimensional printing kit can comprise a particulate build material, a crosslinking agent and a structural modifier. The particulate build material may comprise a polyhydroxylated polymer having hydroxyl groups. The crosslinking gent is for crosslinking the polyhydroxylated polymer by a reaction with the hydroxyl groups. The structural modifier can have a plurality of functional groups for forming a network within the hydrogel, and where the structural modifier may have a reactivity that is chemically orthogonal to the reaction with the hydroxyl groups for crosslinking the polyhydroxylated polymer.

16 Claims, 5 Drawing Sheets

(51) Int. Cl.

| | |
|---|---|
| ***B33Y 70/00*** | (2020.01) |
| ***C09D 11/023*** | (2014.01) |
| ***C09D 11/033*** | (2014.01) |
| ***C09D 11/037*** | (2014.01) |
| ***C09D 11/106*** | (2014.01) |
| ***C09D 11/328*** | (2014.01) |
| ***C09D 11/38*** | (2014.01) |
| *B29K 105/00* | (2006.01) |
| *B29K 105/24* | (2006.01) |

(52) U.S. Cl.

CPC .......... *C09D 11/033* (2013.01); *C09D 11/037* (2013.01); *C09D 11/106* (2013.01); *C09D 11/328* (2013.01); *C09D 11/38* (2013.01); *B29K 2105/0005* (2013.01); *B29K 2105/0061* (2013.01); *B29K 2105/24* (2013.01)

(56) References Cited

U.S. PATENT DOCUMENTS

| | | | | |
|---|---|---|---|---|
| 10,471,181 | B2 | 11/2019 | Martin et al. | |
| 2001/0050031 | A1* | 12/2001 | Bredt | B33Y 70/10 106/204.01 |
| 2004/0135276 | A1* | 7/2004 | Nielsen | B29C 64/165 700/98 |
| 2005/0087902 | A1* | 4/2005 | Farr | B29C 64/165 425/375 |
| 2012/0018915 | A1* | 1/2012 | Ookubo | B33Y 70/10 106/205.01 |
| 2017/0145202 | A1 | 5/2017 | Sparks et al. | |
| 2020/0054440 | A1 | 2/2020 | Aguilar | |
| 2020/0062877 | A1 | 2/2020 | Knopf et al. | |

* cited by examiner (A)

(B)

THREE-DIMENSIONAL PRINTING OF HYDROGELS

BACKGROUND

Three-dimensional (3D) printing is an additive printing process, which is often used to make three-dimensional solid parts from a digital model. 3D printing is often used in rapid product prototyping, mold generation, mold master generation, and short run manufacturing. Three-dimensional printing processes have previously, however, been unsuitable for use with certain types of material, three-dimensional pointing processes. Due to the number of variables involved in three-dimensional printing with new materials, it can be difficult to provide such presses while also providing print accuracy and maintaining the desired material properties in the three-dimensional printed objects.

Figure 1:
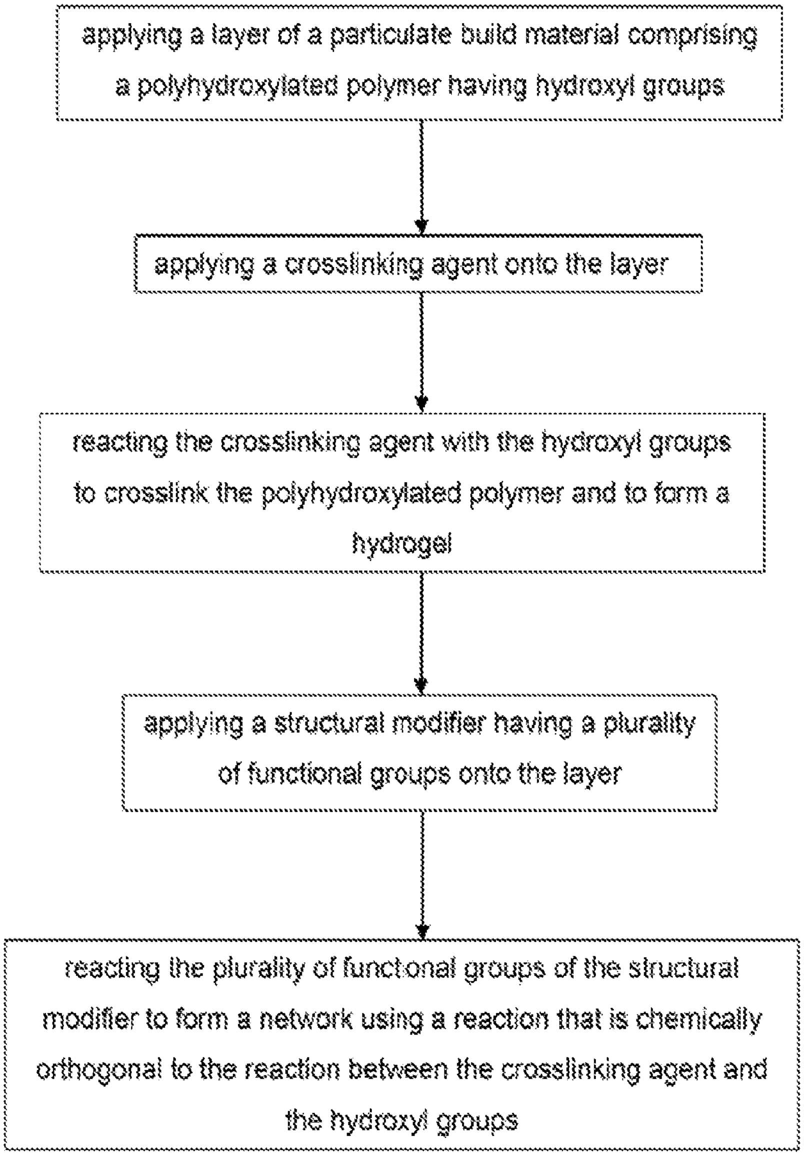
FIG. 1 is a flow chart showing a method of three-dimensional printing a hydrogel according to an example of the present disclosure.

The figures depict several examples of the present disclosure. However, it should be understood mat the present disclosure is not limited to the examples depicted in the figures

DETAILED DESCRIPTION

As used in the present disclosure, the term "about" is used to provide flexibility to an endpoint of a numerical range. The degree of flexibility of this term can be dictated by the particular variable and is determined based on the associated description herein.

Amounts and other numerical data may be expressed or presented herein in a range format. It is to be understood that such a range format is used merely for convenience and brevity and thus should be interpreted flexibly to include not just the numerical values explicitly recited as the limits of the range, but also to include individual numerical values or sub-ranges encompassed within that range as if each numerical value and sub-range is explicitly recited.

As used in the present disclosure, the terms "first", "second" etc. are used herein as labels, unless the context indicates otherwise, to distinguish between features of the same type, such as when there are, for example, several structural modifiers, networks or functional groups. A reference to a "second" feature should not be interpreted as requiring the presence of a "first" feature of the same type unless the context indicates otherwise. Thus, for example, reference to a "second network" does not need a "first network" to be present.

As used herein, the term "water-soluble" refers to materials that can be dissolved in water at a concentration from about 5 wt % to about 99 wt % of the dissolved material (e.g. at about 20° C.) with respect to the entire weight of the solution. The solution of a water-soluble material can be fully transparent without any phase separation. Materials that are not water-soluble can be referred to as "water-insoluble".

As used in the present disclosure, the term "comprises" has an open meaning, which allows other, unspecified features to be present. This term embraces, but is not limited to, the semi-closed term "consisting essentially of" and the closed term "consisting of". Unless the context indicates otherwise, the term "comprises" may be replaced with either this semi-closed term or the closed term.

It is noted that, as used in this specification and the appended claims, the singular forms "a", "an" and "the" include plural referents unless the context clearly dictates otherwise.

The present disclosure refers herein to a hydrogel three-dimensional (3D) printing kit. The hydrogel 3D printing kit comprises a particulate build material and a crosslinking agent. The particulate build material comprises a polyhydroxylated polymer having hydroxyl groups. The crosslinking agent is for crosslinking the polyhydroxylated polymer by a reaction with the hydroxyl groups. The hydrogel 3D printing kit typically comprises a structural modifier. The structural modifier has a plurality of functional groups for forming a network within the hydrogel. The structural modifier has a reactivity that is chemically orthogonal to the reaction with the hydroxyl groups for crosslinking the polyhydroxylated polymer.

The hydrogel 3D printing kit may be used in a in a method of 3D printing a hydrogel, such as described in the present disclosure.

Thus, the present disclosure also refers herein to a method of three-dimensional (3D) printing a hydrogel. The method comprises applying a layer of a particulate build material. The particulate build material comprises comprising a polyhydroxylated polymer having hydroxyl groups. The method further comprises applying a crosslinking agent onto the layer, and reacting the crosslinking agent with the hydroxyl groups to crosslink the polyhydroxylated polymer and to form a hydrogel.

The method may further comprise applying a structural modifier onto the layer. The structural modifier has a plurality of functional groups. The method comprises reacting the plurality of functional groups of the structural modifier to form a network using a reaction that is chemically orthogonal to the reaction between the crosslinking agent and the hydroxyl groups.

The present disclosure refers herein to a three-dimensional (3D) printed hydrogel. The 3D printed hydrogel comprises an interpenetrating polymer network. The interpenetrating polymer network may comprise a crosslinked polyhydroxylated polymer and a branched thioether polymer. The 3D printed hydrogel may, for example, be obtained from a method of 3D printing a hydrogel in the present disclosure.

For the avoidance of doubt, features relating to any aspect of the kits, methods and hydrogels herein are equally applicable to one another regardless of whether they are explicitly discussed in the context of particular aspect of the disclosure. For example, features to the kits of the present disclosure are equally applicable to the methods and hydrogels of the present disclosure, unless the context clearly indicates otherwise.

It is to be understood that this disclosure is not limited to the kits, the methods or the hydrogels disclosed herein. It is also to be understood that the terminology used in this disclosure is used for describing particular examples. The terms are not intended to be limiting because the scope of the present disclosure is intended to be limited by the appended claims and equivalents thereof.

The present disclosure concerns hydrogels. A hydrogel is a material comprising a network of hydrophilic polymer chains permeated by water, typically a relatively large amount of water. The material is a gel because the network ran maintain its structure while retaining or holding the water.

Hydrogels have many applications in the field of life sciences. Scaffolds for tissue engineering ran be made from hydrogels. The high-water content of the hydrogel can provide a suitable environment for hying cells. In certain examples, the methods described herein can be performed at temperatures that can be suitable for living cells, such as near normal body temperatures. Accordingly, these methods can be used for applications in which living cells may be present during the three-dimensional printing process.

Hydrogels can also be used as a medium for cell culture. Additionally, hydrogels can be injectable or implantable and may be used to deliver drugs or help with tissue regeneration. Hydrogels can also be used fora variety of other applications related to life sciences or in other non-related fields.

It has been found that hydrogels can be manufactured by three-dimensional (3D) printing.

The 3D printed hydrogels of the present disclosure have an interpenetrating polymer network. This interpenetrating polymer network may be formed through a double network of cross inked constituents. The double network comprises a first network formed by crosslinking the main polymer constituent of the hydrogel and a second network formed by crosslinking a structural modifier. In comparison to hydrogels that do not comprise an additional network from the structural modifier, these 3D printed hydrogels can have enhanced mechanical properties, such as greater mechanical robustness.

The 3D printed hydrogels of the present disclosure are made from a particulate build material. Thus, the kits of the present disclosure comprise a particulate build material.

In the present disclosure, the method of 3D printing a hydrogel comprises applying a layer of a particulate build material. The particulate build material may be applied as a layer onto the build platform of a 3D printing system or onto a layer including a particulate build material that has been applied previously.

The particulate build material can have an average particle size (e.g. arithmetic mean particle size) from about 20 μm to about 600 μm. For example, the average particle size can be from about 20 μm to about 500 μm, such as from about 30 μm to about 400 μm or from about 40 μm to about 300 μm.

The particulate build material can have a D50 particle size from about 20 μm to about 600 μm. For example, the D50 particle size can be from about 20 μm to about 500 μm, such as from about 100 μm to about 300 μm.

Additionally, the particulate build material can have a D90 particle size from about 100 μm to about 800 μm, such as from about 200 μm to about 600 μm or from about 300 μm to about 500 μm.

As used herein, the expression "particle size" in the terms "average particle size", "D50 particle size" and "D90 particle size" refer to the particle diameter in a number distribution. For non-spherical particles, the particle diameter refers to the diameter of a volume equivalent sphere diameter. The volume equivalent sphere diameter refers to the diameter of a sphere having the same volume as the non-spherical particle. The D50 particle size is the median diameter in a number distribution. The D90 particle size is the diameter at which 90% of the particles in a number distribution have a diameter less than that particle size.

The average particle size, the D50 particle size and the D90 particle size can each be measured using a particle analyser, such as the MASTERSIZER™ 3000 available from Malvern Panalytical (UK). The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

The particulate build material comprises a polyhydroxylated polymer.

Typically, the polyhydroxylated polymer is a non-crosslinked polymer or a partially crosslinked polymer. In one example, the polyhydroxylated polymer is a non-crosslinked polymer.

In general, the polyhydroxylated polymer is swellable. The term "swellable" as used herein refers to a polyhydroxylated polymer that can absorb water. Thus, any reference to a "polyhydroxylated swellable polymer" relates to a polyhydroxylated polymer that is swellable with water.

When the polymer is swellable, it tan be sufficiently hydrophilic that the dry polymer can absorb water. Additionally, swellable polymers can have or form a polymer network that can absorb and hold water without become entirely dissolved by the water.

The polyhydroxylated polymer my comprise a polyvinyl alcohol, cellulose, gelatin, alginate, chitosan, poly(2-hydroxyethyl acrylate), poly(2-hydroxyethyl methacrylate), poly(acrylic acid), poly(methacrylic acid), poly(N,N-dimethylacrylamide), poly(N,N-diethylacrylamide), poly(N-isopropylacrylamide) or a combination thereof. These polymers are polyhydroxylated swellable polymers.

The particulate build material can include one polyhydroxylated polymer or a plurality of polyhydroxylated polymers (e.g. a combination of two or more different polyhydroxylated polymers as disclosed herein).

The polyhydroxylated polymer has hydroxyl groups (i.e. a plurality of hydroxyl groups). Each hydroxyl group may be a cross-linkable hydroxyl group.

The polyhydroxylated polymer may include two or more hydroxyl groups per polymer chain. The polyhydroxylated polymer may have from about 2 to about 20,000 hydroxyl groups per polymer chain.

Generally, each repeating unit of the polyhydroxylated polymer comprises a hydroxyl group.

The polyhydroxylated polymer having hydroxyl groups is typically a polyvinyl alcohol, cellulose, gelatin, alginate, chitosan, poly(2-hydroxyethyl acrylate), poly(2-hydroxyethyl methacrylate) or a combination thereof.

The polyhydroxylated polymer can, in general, have a weight average molecular weight from about 1,000 Mw to about 500,000 Mw. In an example, the weight average molecular weight can be from about 10,000 Mw to about 300,000 Mw or from about 20,000 Mw to about 200,000 Mw.

In one example, the polyhydroxylated polymer having hydroxyl groups is a polyvinyl alcohol. The polyvinyl alcohol may have a weight average molecular weight from about 1,000 Mw to about 500,000 Mw, such as from about 10,000 Mw to about 300,000 Mw or from about 20,000 Mw to about 200,000 Mw.

The particulate build material is typically in the form of a powder, such as a powder for use in an MJF process.

The particulate build material can include polyhydroxylated polymer particles having a variety of shapes, such as substantially spherical particles or irregularly-shaped particles. In one example, the polyhydroxylated polymer particles are substantially spherical.

The polymer particles can be capable of being formed into three-dimensional printed objects with a resolution of about 20 μm to about 1000 μm, such as about 3D μm to about 800 μm or about 40 μm to about 600 μm.

Generally, the particulate build material comprises an amount of the polyhydroxylated polymer of at least about 50 wt %, such as at least about 60 wt % or at least about 75 wt %. The polyhydroxylated polymer is the main constituent of the build material for forming the hydrogel.

Typically, the particulate build mater comprises from at least about 75 wt % of the polyhydroxylated polymer, such as from about 90 wt % to about 95 wt % or from about 90 wt % to about 100 wt %.

In one example, the particulate build material may further comprise a filler.

The filler can include inorganic particles, such as alumina, silica, fibers, carbon nanotubes, or a combination thereof. When the swellable polymer particles become crosslinked together during three-dimensional printing, the filler particles can become embedded in the crosslinked polymer network, forming a composite material.

The filler may include a free-flow agent or an anti-caking agent. Such agents can prevent packing of the powder particles, coat the powder particles and smooth edges to reduce inter-particle friction, and/or absorb moisture.

When the particulate build material comprises a filler, then the particulate build material may have a weight ratio of polyhydroxylated polymer to filler of from about 1,000:1 to about 90:10, such as from about 99:1 to about 9:55.

The hydrogel of the present disclosure may have a first network formed by crosslinking the polyhydroxylated polymer. The crosslinks are typically intermolecular. Thus, a crosslink is formed between two molecules of the polyhydroxylated polymer, such as between the hydroxyl group of a first polyhydroxylated polymer and the hydroxyl group of a second polyhydroxylated polymer.

The first network can be formed by crosslinking individual strands of the polyhydroxylated polymer. In one example, the polyhydroxylated polymer may be a water-soluble polymer (e.g. before crosslinking) and the polyhydroxylated polymer can be crosslinked by the crosslinking agent during three-dimensional printing. The crosslinked polyhydroxylated polymer may be water insoluble.

Typically, the polyhydroxylated polymers described herein are non-crosslinked before use in the three-dimensional printing process. The non-crosslinked polyhydroxylated polymers may also be water-soluble.

The polyhydroxylated polymer can become crosslinked when the crosslinking agent is applied and this can allow the crosslinked polyhydroxylated polymer to hold water without the crosslinked structure (e.g. first network) dissolving in the water. When the crosslinking agent is applied to the polyhydroxylated polymer, linkages can be formed between individual polymer strands or molecules so that the polyhydroxylated polymers and their associated particulates are crosslinked together to form a larger crosslinked structure.

The kits of the present disclosure comprise a crosslinking agent. Thus, in one example, the hydrogel three-dimensional printing kit may comprise a particulate build material and a crosslinking agent.

In general, the crosslinking agent is for crosslinking the polyhydroxylated polymer by a reaction with the hydroxyl groups. Thus, the crosslinking agent may be reactive with hydroxyl groups of the polyhydroxylated polymer to crosslink the polyhydroxylated polymer.

The crosslinking agent may be reactive to form (a) hydrogen bonds, (b) ester groups or (c) a metal ion coordination complex, with the hydroxyl groups of the polyhydroxylated polymers.

In one example, the crosslinking agent is for forming hydrogen bonds with the hydroxyl groups of the polyhydroxylated polymers. Thus, the crosslinking agent can be reactive to form hydrogen bonds with the hydroxyl groups of the polyhydroxylated polymers. When the crosslinking agent is for forming hydrogen bonds, then the crosslinking agent may be boric acid or a salt thereof. Salts of boric acid include sodium tetraborate, potassium tetraborate or lithium tetraborate. In a further example, the crosslinking agent is sodium tetraborate.

Figure 2:
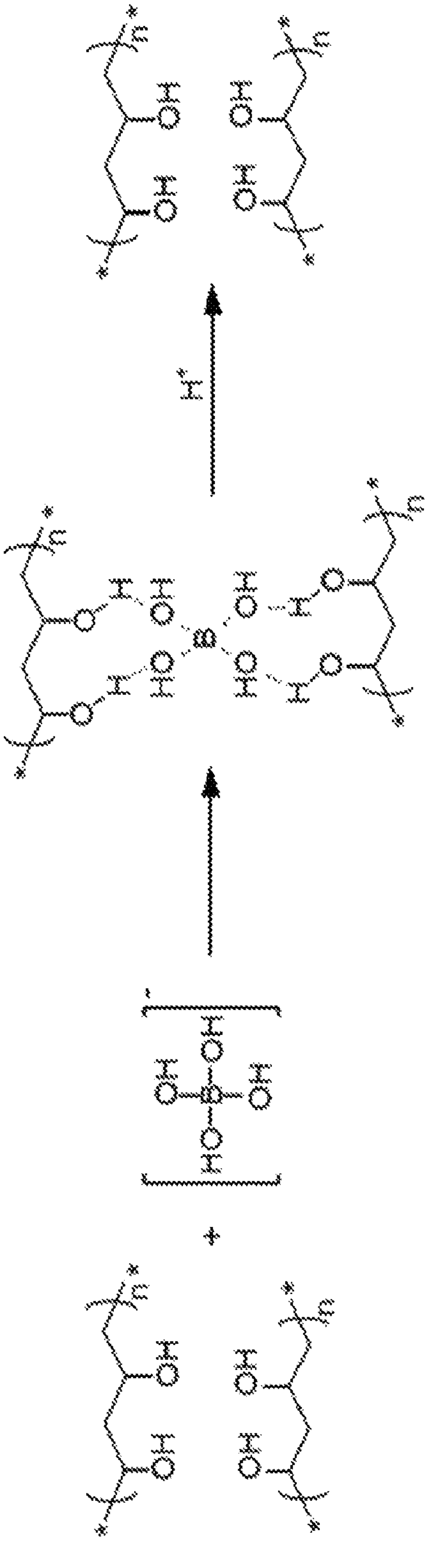
FIG. 2 is a schematic illustration of a crosslinking reaction of a borate ion with polyvinyl alcohol polymer strands according to an example of the present disclosure.

Without wishing to be bound by theory, it is believed that boric acid or a salt thereof can crosslink the polyhydroxylated polymer by forming a hydrogen bonded coordination complex with the hydroxyl groups of the polymer, such as shown in FIG. 2. Additionally or alternatively, the boric acid or a salt thereof may crosslink the polyhydroxylated polymer by forming a borate ester with the hydroxylated groups of the polymer.

In another example, the crosslinking agent is for forming ester groups with hydroxyl groups of the polyhydroxylated polymers. Thus, the crosslinking agent can be reactive to form ester groups with the hydroxyl groups of the polyhydroxylated polymers. The crosslinking agent may form an inorganic ester or an organic ester (e.g. a compound comprising a carboxylate ester group) with the hydroxyl groups of the polyhydroxylated polymers.

When the crosslinking agent is for forming inorganic ester groups, then the crosslinking agent may be boric acid or a salt thereof, such as described above, or phosphoric acid or a salt thereof.

When the crosslinking is for forming organic ester groups, then the crosslinking agent may be a dicarboxylic acid, a tricarboxylic acid or a salt or an ester thereof.

The dicarboxylic acid may be aliphatic dicarboxylic acid of an aromatic dicarboxylic acid. The aliphatic dicarboxylic acid may comprise 2 to 10 carbon atoms. The aromatic dicarboxylic acid may comprise 8 carbon atoms.

The aliphatic dicarboxylic acid may be oxalic acid, malonic acid, succinic acid, fumaric acid, maleic acid, glutaric acid, adipic acid, pimelic acid, suberic acid, azelaic acid or sebacic acid. The aromatic dicarboxylic acid may be phthalic acid, iso-phthalic acid or terephthalic acid.

The tricarboxylic acid may be an aliphatic tricarboxylic acid or an aromatic tricarboxylic acid. The aliphatic tricarboxylic acid may comprise from 4 to 10 carbon atoms. The aromatic tricarboxylic acid may comprise 9 carbon atoms.

The aliphatic tricarboxylic acid may be citric acid, cis-aconitic acid or trans-aconitic acid. The aromatic tricarboxylic acid may be trimesic acid.

In a further example, the crosslinking agent is for forming a metal ion coordination complex with hydroxyl groups of the polyhydroxylated polymers. Thus, the crosslinking can be reactive to form a coordination complex with the hydroxyl groups of the polyhydroxylated polymer. The hydroxyl groups or conjugate bases thereof act as ligands or complexing agents.

When the crosslinking agent is for forming a coordination complex, then the crosslinking agent may include cationic calcium, cationic barium or a combination thereof.

Generally, the crosslinking agent is included as part of a crosslinker formulation.

A crosslinker formulation typically comprises the crosslinking agent.

The kits of the present disclosure may comprise a crosslinker formulation. Thus, in one example, a hydrogel three-dimensional printing kit comprises a particulate build material and a crosslinker formulation.

The crosslinker formulation may comprise the crosslinking agent in an amount of from about 0.1 wt % to about 50 wt %, such as about 0.5 wt % to about 25 wt % or about 1.0 wt % to about 20 wt %.

The amount of crosslinking agent in the crosslinker formulation can be adjusted to provide a suitable degree of crosslinking in the three-dimensional printed hydrogels. The amount of crosslinking agent may also be selected to be within a range that provides good jettability when the crosslinker formulation is jetted from fluid ejectors during three-dimensional printing. When large amounts of crosslinking agent are used, then a relatively higher degree of crosslinking in the three-dimensional printed hydrogel can be obtained. This can affect the properties of the hydrogel. For example, hydrogels with a higher degree of crosslinking can nave greater mechanical strength and can be more rigid. Hydrogels with a lower degree of crosslinking can be weaker and more flexible.

Typically, the crosslinker formulation comprises the crosslinking agent and water. The combination of a crosslinking agent and water in the crosslinker formulation can crosslink and cause swelling of the polyhydroxylated polymer, and can thereby form a three-dimensional printed hydrogel.

The crosslinking agent can be dissolved in the crosslinker formulation. Thus, the crosslinking agent can be soluble in water and optionally a co-solvent of the crosslinker formulation.

In another example, the crosslinking agent can be dispersed in the crosslinker formulation. Such a dispersion may be formed if the crosslinking agent is not soluble.

The crosslinker formulation may further comprise a surfactant. The surfactant may be a cationic surfactant, an anionic surfactant or a non-ionic surfactant.

The surfactant may be an alkyl polyethylene oxide, an alkyl phenyl polyethylene oxide, a polyethylene oxide block copolymer, an acetylenic polyethylene oxide, a polyethylene oxide (di)ester, a polyethylene oxide amine, a protonated polyethylene oxide amine, a protonated polyethylene oxide amide, a dimethicone copolyol, or a substituted amine oxide. Suitable surfactants can include, but are not limited to, liponic esters such as TERGITOL™ 15-S-12; TERGITOL™ 15-S-7; LEG-1 and LEG-7; TRITON™ X-100; TRITON™ X-405; or sodium dodecylsulfate.

Typically, the surfactant is a non-ionic surfactant, such as an alcohol ethoxylate, particularly a secondary alcohol ethoxylate.

In general, the crosslinker formulation comprises the surfactant in an amount of from about 0.01 wt % to about 20 wt %, such as about 0.1 wt % to about 10 wt %. The crosslinker formulation may comprise the surfactant in an amount of, for example, about 0.5 wt % to about 5 wt % or about 0.1 wt % to about 1.0 wt %.

In addition to water, the crosslinker formulation may comprise a co-solvent. The co-solvent is typically an organic solvent.

The co-solvent may be an aliphatic alcohol, an aromatic alcohol, a diol, a glycol, a glycol ether, a polyglycol ether, a caprolactam, a formamide or an acetamide. Examples of such co-solvents include 1-aliphatic alcohols, secondary aliphatic alcohols, 1,2-alcohols, 1,3-alcohols, 1,5-alcohols, propylene glycol, ethylene glycol alkyl ethers, propylene glycol alkyl ethers, higher homologs (e.g. C6-C12) of polyethylene glycol alkyl ethers, glycerol, N-alkyl caprolactams, unsubstituted caprolactams, substituted or unsubstituted formamides, and substituted or unsubstituted acetamides. Specific examples of co-solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

In one example, the co-solvent is propylene glycol, ethylene glycol or glycerol.

When the crosslinker formulation comprises a co-solvent, then the crosslinker formulation comprise a co-solvent in an amount of from about 1.0 wt % to about 25 wt %, such as from about 5 wt % to about 15 wt %. The amount of co-solvent included in the crosslinker formulation may depend on the jetting architecture.

In general, the crosslinker formulation comprises a balance amount of water, such as deionised water. Thus, the amount of water brings the amounts of the ingredients of the crosslinker formulation up to a total amount of 100 wt %.

The crosslinker formulation typically comprises an amount of water of greater than or equal to 50 wt %, such as greater than or equal to 70 wt %.

The crosslinker formulation may further comprise an additive component.

The crosslinker formulation typically comprises each additive component in an amount of from about 0.1 wt % to about 5 wt %, such as from about 0.5 wt % to about 3 wt %. When the crosslinker formulation comprises two or more additive components, then the crosslinker formulation has total amount of additive components that does not exceed 15 wt %.

The additive component may, for example, be selected from a biocide, a viscosity modifier, a pH adjuster, a sequestering agent, a colorant and a preservative.

The biocide may be added to inhibit the growth of harmful microorganisms. The biocide may be a fungicide or a bactericide. Examples of biocides include, but are not limited to, NUOSEPT® (Nudex, Inc., New Jersey), UCARCIDE™ (Union carbide Corp., Texas), VANCIDE® (R.T. Vanderbilt Co., Connecticut), PROXEL® (ICI Americas, New Jersey), and combinations thereof.

The pH adjuster may be a buffer solution. The pH adjuster is be used to control the pH of the fluid.

The sequestering agent may, for example, be EDTA. A sequestering agent may be included to eliminate the deleterious effects of heavy metal impurities.

A colorant may be included if a colored hydrogel is desired. Many polyhydroxylated polymers suitable for hydrogel three-dimensional printing are white or colorless. Accordingly, vivid colors can be obtained by using a colorant during three-dimensional printing.

The colorant can include a dye and/or a pigment. The term “dye” as used herein refers to a compound that can absorb electromagnetic radiation at certain wavelengths in the visible spectrum and can impart a visible color to a formulation hydrogel. The term "pigment" as used herein refers to a particulate material that can change the color of reflected or transmitted light as the result of wavelength-selective absorption. In certain examples, the colorant can include a dye, such as cyan, magenta, yellow, black, or a combination thereof. In other examples, the colorant can include a pigment, such as particles of alumina, silica, other ceramics or organometallics.

The hydrogel of the present disclosure may have a second network formed a structural modifier. This second network may interpenetrate the first network. The interaction of these networks may provide the 3D printed hydrogel with beneficial mechanical properties, such as greater structural rigidity.

In general, the kits of the present disclosure comprise a structural modifier.

In one example, the particulate build material further comprises the structural modifier. Thus, the particulate build material comprises the polyhydroxylated polymer and the structural modifier. In this example, the hydrogel three-dimensional printing kit may comprise (i) a particulate build material, (ii) a crosslinking agent or a crosslinker formulation. The hydrogel 3D printing kit may further comprise (iii) a reaction promoter, such as described herein. Generally, however, the structural modifier is used or applied separately to the particulate build material.

The hydrogel three-dimensional printing kit may comprise (i) a particulate build material, (ii) a crosslinking agent or a crosslinker formulation, and (iii) a structural modifier. The hydrogel 3D printing kit may further comprise (iv) a reaction promoter.

In the present disclosure, the structural modifier can have a plurality of functional groups. The structural modifier is a compound, such as a monomer. This compound may be used to form a repeating unit with the second network.

The plurality of functional groups is for forming a network within the hydrogel. Thus, these functional groups can be reactive to form a network. Each compound or monomer of the structural modifier has a plurality of functional groups in order to form a chain.

Generally, the structural modifier, particularly the plurality of functional groups of the structural modifier, has a reactivity that is chemically orthogonal to the reaction of the hydroxyl groups for crosslinking the polyhydroxylated polymer. Thus, the plurality of functional groups of the structural modifier can form a network using a reaction that is chemically orthogonal to the reaction between the crosslinking agent and the hydroxyl groups of the polyhydroxylated polymers.

The term "chemically orthogonal" as used herein refers to the chemical reactivity of the functional groups of the structural modifier(s) in relation to (a) the reaction between of the hydroxyl groups of the polyhydroxylated polymer and the crosslinking agent, and/or (b) the reactivity of the crosslinks of the first network, which are formed from the hydroxyl groups after crosslinking the polyhydroxylated polymer. The chemical reaction used to form a second network from the functional groups of the structural modifier(s) is chemoselective (e.g. without affecting other functional groups that are present). Thus, the functional groups of the structural modifier(s) do not react with the hydroxyl groups of the polyhydroxylated polymer or the crosslinks of the first network, which are formed from the hydroxyl groups after crosslinking the polyhydroxylated polymer. Typically, the functional groups of the structural modifier(s) chemoselectively react with one another.

The structural modifier(s) do not, in general, comprise a functional group (e.g., a carboxylic acid or a hydroxyl group) that will react with, or break up, the crosslinks of the crosslinked polyhydroxylated polymer.

The second network may be formed by a "click" reaction involving the structural modifier.

As a consequence of this chemical orthogonality, the functional groups of the structural modifier(s) do not react with the crosslinked polyhydroxylated polymers, which could otherwise bring about degradation of the first network within the hydrogel.

The type of chemical reactions that are used to form the crosslinks between the polyhydroxylated polymers are deserted above. These chemical reactions employ a different type of chemistry to that which can be used to form a second network from the structural modifier(s).

The structural modifier has two or more functional groups, such as three or more functional groups. In one example, the structural modifier has four or more functional groups. The number of functional groups determines the structure of the network that is formed from the structural modifier.

In a first example of a structural modifier, the structural modifier is a monomer for forming a homopolymer. The functional groups of the structural modifier can react with one another. The reaction between these functional groups may need initiation, such as by using UV light, heat or a reaction promoter. The reaction promoter may be a free radical initiator or a catalyst.

In a second example of the structural modifier, the structural modifier is reactive to form the second network by a thiol-ene reaction, Michael addition, a thiol-yne reaction, a 1,3-dipolar cycloaddition or a Diels-Alder reaction. These reactions are chemically orthogonal to the reactions described above for crosslinking the polyhydroxylated polymer, which involve acidic or basic conditions for esterification, metal ion coordination or hydrogen bonding to take place.

For the first and second examples above, functional group of the structural modifier may include, or be, an alkene group or an alkyne group.

In general, the present disclosure also relates to the use of a plurality of structural modifiers, such as a first structural modifier and a second structural modifier. The structural modifier described above may be the first structural modifier.

The kits of the present disclosure may comprise a first structural modifier and a second structural modifier.

In one example, the particulate build material comprises the first structural modifier and/or the second structural modifier. This allows the first structural modifier and/or the second structural modifier to be applied as layer with the polyhydroxylated polymer.

When the particulate build material comprises the first structural modifier, then the hydrogel 3D printing kit may comprise (i) the particulate build material, (ii) a crosslinking agent or a crosslinker formulation, and (iii) a second structural modifier.

When the particulate build material comprises the second structural modifier, then the hydrogel 3D printing kit may comprise (i) the particulate build material, (ii) a crosslinking agent or a crosslinker formulation, and (iii) a first structural modifier.

When the particulate build material comprises the first structural modifier and the second structural modifier, then the hydrogel 3D printing kit may comprise (i) the particulate build material, and (ii) a crosslinking agent or a crosslinker formulation.

In the example where a particulate build material comprises the first structural modifier and/or the second structural modifier, the hydrogel 3D printing kit may further comprise a reaction promoter, such as described herein.

Generally, the first structural modifier and the second structural modifier are used or applied separately to the particulate build material, particularly the polyhydroxylated polymer.

In the present disclosure, the hydrogel three-dimensional printing kit typically comprises (i) a particulate build material, (ii) a crosslinking agent or a crosslinker formulation, and (iii) a first structural modifier and/or a second structural modifier.

The first structural modifier can react with the second structural modifier to form the second network.

Typically, the first structural modifier and the second structural modifier, particularly the plurality of first functional groups and the plurality of second functional groups, have a reactivity that is chemically orthogonal to the reaction of the hydroxyl groups for crosslinking the polyhydroxylated polymer. Thus, the plurality of first functional groups and the plurality of second functional groups can form a network using a reaction that is chemically orthogonal to the reaction between the crosslinking agent and the hydroxyl groups of the polyhydroxylated polymers.

The first structural modifier comprises a plurality of first functional groups. Thus, the first structural modifier is a compound having a plurality of first functional groups. The plurality of first functional groups may be two or more first functional groups, such as three or more first functional groups or four or more first functional groups.

The second structural modifier comprises a plurality of second functional groups. The second structural modifier is a compound having a plurality of second functional groups. The plurality of second functional groups may be two or more second functional groups, such as three or more second functional groups or four or more second functional groups.

Generally, the total number of first functional groups and second functional groups may be 5 or more, such as 6 or more.

The first structural modifier and the second structural modifier may be reactive to form the second network by a thiol-ene reaction, a Michael addition, a thiol-yne reaction, a 1,3-dipolar cycloaddition or a Diels-Alder reaction.

When the second network is formed by a thiol-ene reaction, a Michael addition, a 1,3-dipolar cycloaddition or a Diels-Alder reaction, then a functional group of the plurality of first functional groups may include, or can be, an alkene group. The alkene group can react to form the second network by the thiol-ene reaction, Michael addition, the 1,3-dipolar cycloaddition or the Diels-Alder reaction.

When the second network is formed by a thiol-yne reaction, a 1,3-dipolar cycloaddition or a Diels-Alder reaction, then a functional group of the plurality of first functional groups may include, or can be, an alkyne group. The alkyne group can react to form the second network by the thiol-yne reaction.

For a thiol-ene reaction, the functional group of the first plurality of functional groups is, for example, an alkene group.

For a Michael addition, the functional group of the first plurality of functional groups is typically an α,β-unsaturated carbonyl group.

Fora thiol-yne reaction, the functional group of the first plurality of functional groups is, for example, an alkyne group.

For a 1,3-dipolar cycloaddition, typically the functional group of the first plurality of functional groups is a dipolarophile comprising an alkene group or an alkyne group. The 1,3-dipolar cycloaddition may, for example, be a Cu-catalysed azide-alkyne cycloaddition.

For a Diels-Alder reaction, the functional group of the first plurality of functional groups is, for example, a dienophile comprising an alkene group or an alkyne group.

The functional group of the plurality of first functional groups can react with a functional group of the second structural modifier (e.g. of the plurality of second functional groups by a thiol-ene reaction, Michael addition, a thiol-yne reaction, a 1,3-dipolar cycloaddition or a Diels-Alder reaction. The nature of the functional group of the second structural modifier will depend on the type of reaction that is used to form the second network.

When the second network is formed by a thiol-ene or a thiol-yne reaction, then a functional group of the plurality of second functional groups (e.g. of the second structural modifier) is a thiol group (—SH).

When the second network is formed by a Michael addition, then a functional group of the plurality of second functional groups is a nucleophilic group, such as a thiol group (—SH).

When the second network is formed by a 1,3-dipolar cycloaddition, then a functional group of the second plurality of functional groups is a 1,3-dipole. The 1,3-dipole may comprise an aside group, an azomethine ylide group, a carbonyl ylide group, a nitrile ylide group, an azomethine imine group, a carbonyl imine group or a diazoalkane group. In one example, the 1,3-dipole comprises an azide group, such as when the 1,3-dipolar cycloaddition is a Cu-catalysed azide-alkyne cycloaddition.

When the second network is formed by a Diels-Alder reaction, then a functional group of the second plurality of functional groups is a conjugated diene.

Typically, the functional group of the plurality of first functional groups is the same as the remaining functional groups of the plurality of first functional groups. Thus, all the functional groups of the plurality of first functional groups are the same.

In general, the plurality of first functional groups may include, or can be, an alkene or an alkyne.

The functional group of the plurality of second functional groups can be the same as the remaining functional groups of the plurality of first functional groups. Thus, all the functional groups of the plurality of second functional groups are the same.

In one example, the second network is formed by a thiol-ene reaction. The thiol-ene reaction is beneficial because it can be carried out without affecting a variety of other types of functional group.

The first structural modifier may comprise a plurality alkene groups, such as two or more alkene groups. The first structural modifier can comprise three or more alkene groups or four or more alkene groups.

The second structural modifier may comprise a plurality of thiol groups, such as two or more thiol groups. The second structural modifier may comprise three or more thiol groups or, for example, four or more thiol groups.

Generally, the first structural modifier and the second structural modifier have a total number of thiol and alkene groups of 5 or more, such as 6 or more.

The first structural modifier comprising a plurality of alkene groups may, for example, be selected from ethylene glycol diacrylate, ethylene glycol dimethacrylate, diethylene glycol diacrylate, diethylene glycol dimethacrylate, dipropylene glycol diacrylate, dipropylene glycol dimethacrylate, poly(ethylene glycol) diacrylate, poly(ethylene glycol) dimethacrylate, trimethylolpropane triacrylate, glycerol triacrylate, trimethylolpropene ethoxylate triacrylate, 1,3,5-triacryloylhexahydro-1,3,5-triazine, tris-2-(acryloyloxy)ethyl isocyanurate, 1,3,5-triallyl-1,3,5-triazine-2,4,6(1H,3H,5H)-trione, 2,4,6-triallyloxy-1,3,5-triazine, pentaerythritol tetraacrylate and di(trimethylolpropane)tetraacrylate. In one example, the first structural modifier is a poly(ethylene glycol) diacrylate.

The second structural modifier can have two thiol groups and may be selected from 1,2-ethanedithiol, 1,3-propanedithiol, 1,4-butanedithiol, 1,5-pentadithiol, poly(ethylene glycol) dithiol, benzene-1,4-dithiol, benzene-1,3-dithiol and a combination thereof.

When the second structural modifier has three thiol groups, then the second structural modifier may be selected from propane-1,2,3-trithiol, trimethylolpropane tris(3-mercaptopropionate), tris[2-(3-mercaptopropionyloxy)ethyl] isocyanurate and a combination thereof.

The second structural modifier can have four thiol groups. For example, the second structural modifier may be selected from pentraerythrityl tetrathiol, pentaerythritol tetrakis(3-mercaptopropionate), pentaerythritol tetrakis(3-mercaptoacetate) and a combination thereof.

In one example, the second structural modifier is pentaerythritol tetrakis(3-mercaptopropionate). The first structural modifier may be poly(ethylene glycol) diacrylate.

In general, the structural modifier may be included as part of a structural modifier formulation. The kits of the present disclosure may comprise a structural modifier formulation, which comprises the structural modifier as described above.

In one example, the hydrogel 3D printing kit comprises (i) a particulate build material, (ii) a crosslinking agent or a crosslinker formulation, and (iii) a structural modifier formulation. The hydrogel 3D printing kit may further comprise (iv) a reaction promoter. The reaction promoter may be included in a reaction promoter formulation (e.g. a separate formulation to the structural modifier formulation).

When the structural modifier is a monomer for forming a homopolymer, then the structural modifier formulation does not include a reaction promoter.

The structural modifier formulation may comprise the structural modifier in an amount of from about 0.5 wt % to about 50 wt %, such as about 1.0 wt % to about 25 wt % or about 5 wt % to about 20 wt %.

Typically, the structural modifier formulation comprises the structural modifier and a liquid vehicle. The liquid vehicle may be water, an organic solvent or water and an organic co-solvent. In one example, the liquid vehicle is water and an organic co-solvent. The water may be deionised water.

The structural modifier can be dissolved in the liquid vehicle of the structural modifier formulation.

The structural modifier formulation typically comprises an amount of liquid vehicle of greater than or equal to 50 wt %, such as greater than or equal to 70 wt % or greater than equal to 75 wt %.

The organic solvent or organic co-solvent may be an aliphatic alcohol, an aromatic alcohol, a diol, a glycol, a glycol ether, a polyglycol ether, a caprolactam, a formamide or an acetamide. Examples of such co-solvents include 1-aliphatic alcohols, secondary aliphatic alcohols, 1,2-alcohols, 1,3-alcohols, 1,5-alcohols, propylene glycol, ethylene glycol alkyl ethers, propylene glycol alkyl ethers, higher homologs (e.g. C6-C12) of polyethylene glycol alkyl ethers, N-alkyl caprolactams, unsubstituted caprolactams, substituted or unsubstituted formamides, and substituted or unsubstituted acetamides. Specific examples of co-solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

In one example, the organic solvent or organic co-solvent is propylene glycol or ethylene glycol.

When the structural modifier formulation comprises an organic co-solvent, then the structural modifier formulation comprises the organic co-solvent in an amount of from about 1.0 wt % to about 25 wt %, such as from about 5 wt % to about 15 wt %. The amount of co-solvent included the structural modifier formulation may depend on the jetting architecture.

In general, the structural modifier formulation comprises a balance amount of water, such as deionised water. Thus, the amount of water brings the amounts of the ingredients of the structural modifier formulation up to a total amount of 100 wt %.

The structural modifier formulation may further comprise a surfactant. Thus, the structural modifier formulation comprises the structural modifier, the liquid vehicle and the surfactant.

In the structural modifier formulation, the surfactant may be a cationic surfactant, an anionic surfactant or a non-ionic surfactant. The surfactant may be an alkyl polyethylene oxide, an alkyl phenyl polyethylene oxide, a polyethylene oxide block copolymer, an acetylenic polyethylene oxide, a polyethylene oxide (di)ester, a polyethylene oxide amine, a protonated polyethylene oxide amine, a protonated polyethylene oxide amide, a dimethicone copolyol, or a substituted amine oxide. Suitable surfactants can include, but are not limited to, liponic esters such as TERGITOL™ 15-S-12; TERGITOL™ 15-S-7; LEG-1 and LEG-7; TRITON™ X-100; TRITON™ X-405 or sodium dodecylsulfate.

Typically, the surfactant is a non-ionic surfactant, such as an alcohol ethoxylate, particularly a secondary alcohol ethoxylate.

The structural modifier formulation comprises the surfactant in an amount of from about 0.01 wt % to about 20 wt %, such as about 0.1 wt % to about 10 wt %. The structural modifier formulation may comprise the surfactant in an amount of, for example, about 0.5 wt % to about 5 wt % or about 0.1 wt % to about 1.0 wt %.

When the particulate build material comprises the first structural modifier, then the hydrogel 3D printing kit may comprise (i) the particulate build material, (ii) a crosslinking agent or a crosslinker formulation, and (iii) the structural modifier formulation, which comprises the second structural modifier. The hydrogel 3D printing kit may further comprise (iv) a reaction promoter.

When the particulate build material comprises the second structural modifier, then the hydrogel 3D printing kit may comprise (i) the particulate build material, (ii) a crosslinking agent or a crosslinker formulation, and (iii) a structural modifier formulation, which comprises the first structural modifier. The hydrogel 3D printing kit may further comprise (iv) a reaction promoter.

The structural modifier formulation may, for example, comprise the structural modifier and the second structural formulation. Thus, a single structural modifier formulation may be used containing both the first and second structural modifiers. Such a structural modifier formulation may be used in methods of three-dimensional printing when the first structural modifier and the second structural modifier are applied at the same time. The reaction between the first structural modifier and the second structural modifier may be started by application of a free radical initiator.

When the structural modifier formulation comprises the first structural modifier and the second structural modifier, then the structural modifier formulation comprises structural modifiers (e.g. the first and second structural modifiers) in a total amount of from about 2 wt % to about 50 wt %, such as about 5 wt % to about 35 wt % car about 10 wt % to about 25 wt %.

In the example where the structural modifier formulation comprises the first structural modifier and the second structural modifier, then the structural modifier formulation may not comprise a reaction promoter, such as described herein. Otherwise, the structural modifier formulation could form a second network before it is applied to the particulate build material.

Generally, the first structural modifier and the second structural modifier are used or applied separately to one another and separately to the particulate build material, particularly the polyhydroxylated polymer. When used or applied in this way, the first structural modifier and the second structural modifier are included in separate formulations.

A first structural modifier formulation may comprise the first structural modifier. The first structural modifier formulation is the same as the general structural modifier formulation described above, except that it does not comprise the second structural modifier.

The first structural modifier may, for example, comprises the first structural modifier, a surfactant and a liquid vehicle, which comprises water, an organic solvent or water and an organic co-solvent. The surfactant may be referred to as the first surfactant. The liquid vehicle may be referred to as the first liquid vehicle.

The first structural modifier may include a reaction promoter.

A second structural modifier formulation may comprise the second structural modifier.

The second structural modifier formulation may comprise the second structural modifier in an amount of from about 0.5 wt % to about 50 wt %, such as about 1.0 wt % to about 25 wt % or about 5 wt % to about 20 wt %.

The second structural modifier formulation comprises the second structural modifier and a second liquid vehicle. The second liquid vehicle may be water, an organic solvent or water and an organic co-solvent, in one example, the second liquid vehicle is water and an organic co-solvent. The water may be deionised water.

The second structural modifier can be dissolved in the second liquid vehicle of the second structural modifier formulation.

The second structural modifier formulation typically comprises an amount of second liquid vehicle of greater than or equal to 50 wt %, such as greater than or equal to 70 wt % or greater than equal to 75 wt %.

The organic solvent or organic co-solvent may be as described above for the general structural modifier formulation. In one example, the organic solvent or organic co-solvent is propylene glycol or ethylene glycol.

When the second structural modifier formulation comprises an organic co-solvent, then the second structural modifier formulation comprises the organic co-solvent in an amount of from about 1.0 wt % to about 25 wt %, such as from about 5 wt % to about 15 wt %.

In general, the second structural modifier formulation comprises a balance amount of water, such as deionised water. Thus, the amount of water brings the amounts of the ingredients of the second structural modifier formulation up to a total amount of 100 wt %.

The second structural modifier formulation may further comprise a second surfactant. Thus, the second structural modifier formulation comprises the second structural modifier, the second liquid vehicle and the second surfactant.

In the second structural modifier formulation, the second surfactant may be a cationic surfactant, an anionic surfactant or a non-ionic surfactant. The second surfactant may be an alkyl polyethylene oxide, an alkyl phenyl polyethylene oxide, a polyethylene oxide block copolymer, an acetylenic polyethylene oxide, a polyethylene oxide (di)ester, a polyethylene oxide amine, a protonated polyethylene oxide amine, a protonated polyethylene oxide amide, a dimethicone copolyol, or a substituted amine oxide. Suitable second surfactants can include, but are not limited to, liponic esters such as TERGITOL™ 15-S-12; TERGITOL™ 15-S-7; LEG-1 and LEG-7; TRITON X-100; TRITON™ X-405; or sodium dodecylsulfate.

Typically, the second surfactant is a non-ionic surfactant, such as an alcohol ethoxylate, particularly a secondary alcohol ethoxylate.

The second structural modifier formulation comprises the second surfactant in an amount of from about 0.01 wt % to about 20 wt %, such as about 0.1 wt % to about 10 wt %. The second structural modifier formulation may comprise the second surfactant in an amount of, for example, about 0.5 wt % to about 5 wt % or about 0.1 wt % to about 1.0 wt %.

The reaction to form the second network may need UV light, heat and/or a reaction promoter to start the reaction involving the structural modifier(s). The way in which the reaction is initiated will depend on the type of the reaction.

In general, the kits of the present disclosure may include a reaction promoter.

When the structural modifier(s) react to form a second network by a thiol-ene reaction or a thiol-yne reaction, then the reaction promoter may comprise a free radical initiator. The free radical initiator may be an azo compound, a benzoin ether compound, an acetophenone compound, or an acylphosphine oxide compound.

The azo compound may be azobisisobutylonitrile or 1,1'-azobis(cyclohexanecarbonitrile). The benzoin ether may be benzoin ethyl ether, benzoin isobutyl ether or benzoin methyl ether. The acetophenone compound may be 2,2-dimethoxy-2-phenylacetophenone (DMPA), 2,2-diethoxyacetophenone, 2,2-dimethoxy-2-phenylacetophenone or 4'-ethoxyacetophenone, 3'-hydroxyacetophenone, 4'-hydroxyacetophenone or 4'-phenoxyacetophenone. The benzophenone compound may be benzophenone, 2-benzyl-2-(dimethylamino)-4'-morpholinobutyrophenone, 4,4'-bis(diethylamino)benzophenone, 4,4'-bis(dimethylamino)benzophenone, 4,4-dihydroxybenzophenone, 4-(dimethylamino)benzophenone, 2,5-dimethylbenzophenone, 3,4-dimethylbenzophenone, 3-hydroxybenzophenone, 4-hydroxybenzophenone, 2-hydroxy-2-methylpropiophenone, 2-methylbenzophenone or 3-methylbenzophenone.

In one example, the reaction promoter comprises a free radical initiator compound, which is an acetophenone compound, such as 2-dimethoxy-2-phenylacetophenone (DMPA).

When the structural modifier(s) react to form a second network by a Michael addition, then the reaction promoter may comprise a base or Lewis acid catalyst.

When the structural modifier(s) react to form a second network by a 1,3-dipolar cycloaddition, then the reaction promoter may comprise a metal catalyst, such as a rhodium catalyst or a copper catalyst. The copper catalyst may be a catalyst for catalysing the Huisgen reaction.

When the structural modifier(s) react to form a second network by a Diels-Alder reaction, then the reaction promoter may comprise a Diels-Alder catalyst. The Diels-Alder catalyst is typically a Lewis acid, such as a copper salt (e.g. $Cu(OTf)_2$), zinc chloride or aluminium chloride.

In one example, the reaction promoter may be included as part of a structural modifier formulation, particularly when there is a first structural modifier and a second structural modifier.

The structural modifier formulation, such as the first structural modifier formulation, may further comprise the reaction promoter. Alternatively, the second structural modifier formulation may further comprise the reaction promoter. In one example, the first structural modifier include the reaction promoter.

The reaction promoter may be applied or used separately to the structural modifier(s).

When a structural modifier formulation does not comprise the reaction promoter, then the reaction promoter may include a liquid carrier. The liquid carrier may comprise water, an organic solvent or water and an organic co-solvent. The organic solvent or the organic solvent are as described above for the structural modifier formulation.

In one example, the hydrogel 3D kit comprises (i) a particulate build material, (ii) a crosslinker formulation, (iii) a first structural modifier formulation, (iv) a second structural modifier formulation, and (v) a reaction promoter.

In another example, the hydrogel 3D kit comprises (i) a particulate build material, (ii) a crosslinker formulation, (iii) a first structural modifier formulation and (iv) a second structural modifier formulation. The first structural modifier formulation may include the reaction promoter. Alternatively, the second structural modifier formulation may include the reaction promoter.

In each of the above examples, the particulate build material may comprise a polyvinyl alcohol and the crosslinking agent of the crosslinker formulation may be boric acid or a salt thereof. The first structural modifier comprises a plurality of alkene groups. The second structural modifier comprises a plurality of thiol groups. The reaction promoter may be free radical initiator, such as an acetophenone compound.

The present disclosure also relates to a method of 3D printing a hydrogel. The present disclosure also relates to a method of 3D printing a hydrogel. The method comprises applying a layer of the particulate build material, such as described above. The layer may be applied onto the build platform of a 3D panting system or onto a layer including a particulate build material that has been applied previously. The method involves applying an individual layer of the particulate build material.

Typically, individual layers of a particulate build material are applied iteratively. The individual layers may be applied iteratively based on a three-dimensional object model.

In general, the particulate build material has a sufficiently small particle size and a sufficiently regular particle shape to provide about 20 μm to about 600 μm resolution along the x-axis and y-axis (i.e. the axes parallel to the top surface of the powder bed).

As used herein, "resolution" refers to the size of the smallest feature that can be formed on a three-dimensional printed object.

The particulate build material can form a layer from about 20 μm to about 600 μm thick (e.g. immediately after application during the 3D printing process). Fused layers of the printed part may have roughly the same thickness.

The layer thickness may change when the crosslinking agent is applied to the particulate build material because the polyhydroxylated polymer of the particulate build material can absorb water and swell to an increased volume.

In one example, the overall resolution in the z-axis (i.e. depth) direction, based on the layer height of the dry polyhydroxylated polymer particles and/or the layer height when the polyhydroxylated polymer particles absorb water, can be about 20 μm to about 600 μm.

In the methods of the present disclosure, the particulate build material can be applied at and/or maintained at, during the method of 3D printing the hydrogel, a temperature from about 0° C. to about 75° C., such as a temperature from about 20° C. to about 50° C. or from about 30° C. to about 40° C. In one example, the particulate build material can be applied at and/or maintained at a temperature of about 37° C.

A crosslinking is applied onto the layer, in the methods of the present disclosure. The crosslinking agent can be applied onto an individual layer.

Once the crosslinking agent has been applied onto the layer, the crosslinking agent may react with the hydroxyl groups to crosslink the polyhydroxylated polymer and to form a hydrogel. The reaction between the crosslinking agent and the hydroxyl groups may occur upon addition of the crosslinking agent to the layer.

The reaction between the crosslinking agent and the polyhydroxylated polymer forms a first network within the hydrogel.

The crosslinking agent may be applied iteratively and selectively onto an individual layer based on a three-dimensional object model.

Typically, the crosslinking agent is applied as a crosslinker formulation.

Generally, the crosslinker formulation can be applied onto a layer at a contone level so that the layer can include from about 50 wt % to about 95 wt % water based on a total weight of particulate build material and crosslinking agent applied.

In some examples, the crosslinker formulation can be jetted onto the particulate build material using a fluid jetting device, such as inkjet printing architecture. Thermal jetting can function by heating the crosslinking agent to form a vapor bubble that displaces fluid around the bubble, and thereby forces a droplet of fluid out of a jet nozzle. Thus, in some examples the crosslinker formulation can include a sufficient amount of an evaporating liquid that can form vapor bubbles when heated.

As used herein, "ink jetting" or"jetting" refers to compositions are ejected from jetting architecture, such as ink-jet architecture. Ink-jet architecture can include thermal or piezo architecture. Additionally, such architecture can be configured to print varying drop sizes such as less than 10 picoliters, less than 20 picoliters, less than 30 picoliters, less than 40 picoliters, less than 50 picoliters, etc.

In general, the methods of the present disclosure involve reacting the plurality of functional groups of the structural modifier to form a network (e.g. a second network) using a reaction that is chemically orthogonal to the reaction between the crosslinking agent and the hydroxyl groups.

There are various way of incorporating the structural modifier(s) within the hydrogel or the particulate build material by 3D printing.

The plurality of functional groups may be reacted in a homopolymerization reaction to form the network. Alternatively, the plurality of functional groups may be reacted in a thiol-ene reaction, a Michael addition, a thiol-yne reaction, a 1,3-dipolar cycloaddition or a Diels-Alder reaction to form the network.

Typically, in the methods of the present disclosure, the second network is formed after the first network. Thus, polyhydroxylated polymer is reacted with the crosslinking agent before the plurality of groups of the structural modifier are reacted.

In a first example of the method, the particulate build material may comprise a structural modifier. Thus, when the particulate build material is applied as a layer, then the polyhydroxylated polymer and the structural modifier are applied together.

A crosslinking agent may be applied onto the layer. The crosslinking agent may be reacted with the hydroxyl groups of the polyhydroxylated polymer. The reaction forms a hydrogel comprising a first network.

To react the plurality of functional groups of the structural modifier to form a network, a reaction promoter, as described herein, may be applied onto the layer and/or the layer may be treated with UV light or heat. The reaction promoter, UV light and/or heat may bring about the reaction between the functional groups of the structural modifier to form a second network.

In a second example of the method, the structural modifier is applied onto the layer. Thus, the particulate build material does not comprise the structural modifier.

The structural modifier may applied onto the layer before after or concurrently with the crosslinking agent. The structural modifier is typically applied onto the layer after the crosslinking agent has been applied onto the layer.

The structural modifier may be applied iteratively and selectively onto the layer based on a three-dimensional object model.

A structural modifier formulation, as described herein, may be applied onto the layer to apply the structural modifier.

A reaction promoter, as described herein, may be applied to the layer to react the plurality of functional groups of the structural modifier to form a network. The reaction promoter is typically applied onto the layer after the structural modifier has been applied.

Additionally or alternatively to applying the reaction promoter, the layer may be heated and/or subject to UV light to react the plurality of functional groups of the structural modifier to form a network.

In a third example of the method, the particulate build material may comprise a first structural modifier and the second structural modifier. Thus, when the particulate build material is applied as a layer, then the polyhydroxylated polymer, the first structural modifier and the second structural modifier are applied together.

A crosslinking agent may be applied onto the layer. The crosslinking agent may be reacted with the hydroxyl groups of the polyhydroxylated polymer. The reaction forms a hydrogel comprising a first network.

To react the plurality of first functional groups of the first structural modifier and the plurality of second functional groups of the second structural modifier to form a network, a reaction promoter, as described herein, may be applied onto the layer and/or the layer may be treated with UV light or heat. The reaction promoter, UV light and/or heat may bring about the reaction between the plurality of first and second functional groups of the first and second structural modifiers, respectively, to form a second network.

In a fourth example of the method, the particulate build material may comprise either the first structural modifier or the second structural modifier. Thus, the particulate build material comprises a single structural modifier.

When the particulate build material is applied as a layer, then either the first structural modifier or the second structural modifier and the polyhydroxylated polymer are applied together.

A crosslinking agent may be applied onto the layer. The crosslinking agent may be reacted with the hydroxyl groups of the polyhydroxylated polymer. The reaction forms a hydrogel comprising a first network.

When the particulate build material comprises the first structural modifier, then the second structural modifier may applied onto the layer before, after or concurrently with the crosslinking agent. The second structural modifier is typically applied onto the layer after the crosslinking agent has been applied onto the layer.

The second structural modifier may be applied iteratively and selectively onto the layer based on a three-dimensional object model.

A second structural modifier formulation, as described herein may be applied onto the layer to apply the second structural modifier.

When the particulate build material comprises the second structural modifier, then the first structural modifier may applied onto the layer before, after or concurrently with the crosslinking agent. The first structural modifier is typically applied onto the layer after the crosslinking agent has been applied onto the layer.

The first structural modifier may be applied iteratively and selectively onto the layer based on a three-dimensional object model.

A first structural modifier formulation, as described herein, may be applied onto the layer to apply the first structural modifier.

A reaction promoter, as described herein, may be applied to the layer to react the plurality of first functional groups of the first structural modifier with the plurality of second functional groups of the second structural modifier to form a second network. The reaction promoter is typically applied onto the layer after the first or second structural modifier has been applied.

Additionally or alternatively to applying the action promoter, the layer may be heated and/or subject to UV light to react the plurality of first functional groups of the first structural modifier with the plurality of second functional groups of the second structural modifier to form a second network.

In a fifth example of the method, a first structural modifier is applied onto the layer and a second structural modifier is applied onto the layer. Thus, the particulate build material does not comprise the first structural modifier and the second structural modifier.

Each of the first structural modifier and the second structural modifier may applied onto the layer before, after or concurrently with the crosslinking agent. The first structural modifier and the second structural modifier are typically applied onto the layer after the crosslinking agent has been applied onto the layer.

The first structural modifier and the second structural modifier may each be applied iteratively and selectively onto the layer based on a three-dimensional object model.

The first structural modifier and the second structural modifier may be applied separately or simultaneously onto the layer.

When the first structural modifier and the second structural modifier are to be applied simultaneously onto the layer, then a single structural modifier formulation comprising the first structural modifier and the second structural modifier, as described above, may be applied onto the layer to apply the first structural modifier and the second structural modifier.

A reaction promoter may be applied to the layer to react the plurality of first functional groups of the first structural modifier with the plurality of second functional groups of the second structural modifier to form a second network. The reaction promoter is typically applied onto the layer after the first and second structural modifiers have been applied.

Additionally or alternatively to applying the reaction promoter, the layer may be heated and/or subject to UV light to react the plurality of first functional groups of the first structural modifier with the plurality of second functional groups of the second structural modifier to form a second network.

When the first structural modifier and the second structural modifier are to be applied separately onto the layer, then a first structural modifier formulation, as described above, and a second structural modifier formulation, as described above, may be separately applied onto the layer to separately apply the first structural modifier and the second structural modifier.

The first structural promoter may be applied onto the layer before or after the second structural promoter is applied onto the layer.

When the first and second structural modifiers are applied separately, then a reaction promoter may be applied onto the layer with either the first structural modifier or the second structural modifier.

Thus, a first structural modifier formulation may comprise the reaction promoter. When the first structural modifier formulation comprises the reaction promoter, then the first structural modifier formulation is applied onto the layer after the second structural modifier or the second structural modifier formulation.

Alternatively, a second structural modifier formulation may comprise the reaction promoter. When the second structural modifier formulation comprises the reaction promoter, then the second structural modifier formulation is applied onto the layer after the first structural modifier or the first structural modifier formulation.

As a further alternative, the reaction promoter may be applied onto the layer separately to the first structural modifier and the second structural modifier. The reaction promoter is applied onto the layer after both the first structural modifier and the second structural modifier have been applied.

The reaction promoter may be applied to the layer to react the plurality of first functional groups of the first structural modifier with the plurality of second functional groups of the second structural modifier to form a second network. The reaction promoter is typically applied onto the layer after the first or second structural modifier has been applied.

Additionally or alternatively to applying the reaction promoter, the layer may be heated and/or subject to UV light to react the plurality of first functional groups of the first structural modifier with the plurality of second functional groups of the second structural modifier to form a second network.

Each structural modifier formulation may be applied onto the layer by ink jetting.

When the reaction promoter is applied separately to the structural promoter(s), such as the first and second structural promoters, then the reaction promoter may be applied by ink jetting.

In general, the methods of 3D printing of the present disclosure can form a 3D printed hydrogel objection by successively forming layers of the hydrogel, typically according to three-dimensional object model.

The first network formed by crosslinking the polyhydroxylated polymer may be reversible. By removing the first network in certain regions of the 3D printed hydrogel, the mechanical properties of the hydrogel in those regions are modified.

The methods of the present disclosure may comprise removing the crosslinking between the polyhydroxylated polymer by acidifying the hydrogel.

The methods may include applying an acid to the hydrogel or a layer of the hydrogel. The acid is applied to react with the crosslinked polyhydroxylated polymer to break the first network.

The present disclosure also relates to a three-dimensional printed hydrogel. The 3D printed hydrogel is obtained from methods of the present disclosure.

The 3D printed hydrogels or 3D printed hydrogel objects can be formed using a layer-by-layer process in which individual layers of particles of the polyhydroxylated polymer are crosslinked by applying a crosslinking agent to form a first network, and a second network is formed by a reaction involving a structural modifier.

In one example, the 3D printed hydrogel is obtained from MJF.

In general, me 3D printed hydrogel has a body.

The 3D printed hydrogel, such as the body of the hydrogel, comprises an interpenetrating polymer network. The interpenetrating polymer network comprises a first network and the second network. The first network interpenetrates the second network. The first and second networks are each described herein.

The interpenetrating polymer network comprises a crosslinked polyhydroxylated polymer. The first network of the interpenetrating network comprises the crosslinked polyhydroxylated polymer.

In one example, the crosslinked polyhydroxylated polymer is a crosslinked polyvinyl alcohol.

The interpenetrating polymer network also comprises a crosslinked structural modifier, such as crosslinked first and second structural modifiers. The second network of the interpenetrating network comprise the crosslinked structural modifier, such as the crosslinked first and second structural modifier.

The composition of the second network depends on the composition of the structural modifier(s).

In one example, the interpenetrating network comprises a branched thioether polymer. Thus, the second network comprises the branched thioether polymer.

Typically, the hydrogel comprises water. The hydrogel may comprise water in an amount of 10 wt % or more, such as an amount from about 26 wt % to about 76 wt % or from about 50 wt % to about 95 wt %.

The interpenetrating network may be distributed throughout the body or bulk of the hydrogel. Thus, both the first network and the second network are distributed throughout the body of the hydrogel.

In another example, the hydrogel comprises a first region and a second region.

The first region may comprise the interpenetrating polymer network. Thus, part of the hydrogel comprises both the first network and the second network.

The second region may comprise the first network as the only network. The second region may comprise the structural modifier(s), such as unreacted structural modifier(s).

Alternatively, the second region comprises the second network as the only network. The second region may comprise non-crosslinked polyhydroxylated polymer. This may be achieved when the second region has been treated with acid to reverse the crosslinking between the polyhydroxylated polymer.

Turning more specifically to the figures, FIG. 1 shows a flow chart with an example of the method. The method shown in this example results in the formation of a layer of a hydrogel, which then has its mechanical properties enhanced by the application of a structural modifier.

FIG. 2 is a reaction scheme showing the crosslinking of a polyvinyl alcohol using sodium tetraborate as a crosslinking agent. Sodium tetraborate can from tetrahedral borate ions, which can crosslink polyvinyl alcohol by forming hydrogen bonds with hydroxyl groups of the polyvinyl alcohol. A mechanism for crosslinking polyvinyl alcohol using tetrahedral borate ions is shown in FIG. 2. The asterisk (*) illustrates a portion of the polyvinyl alcohol polymer that can extend in either directions. As shown, the crosslinking can be reversed, in some examples, by exposing the polymer to an acidic pH.

Figure 3:
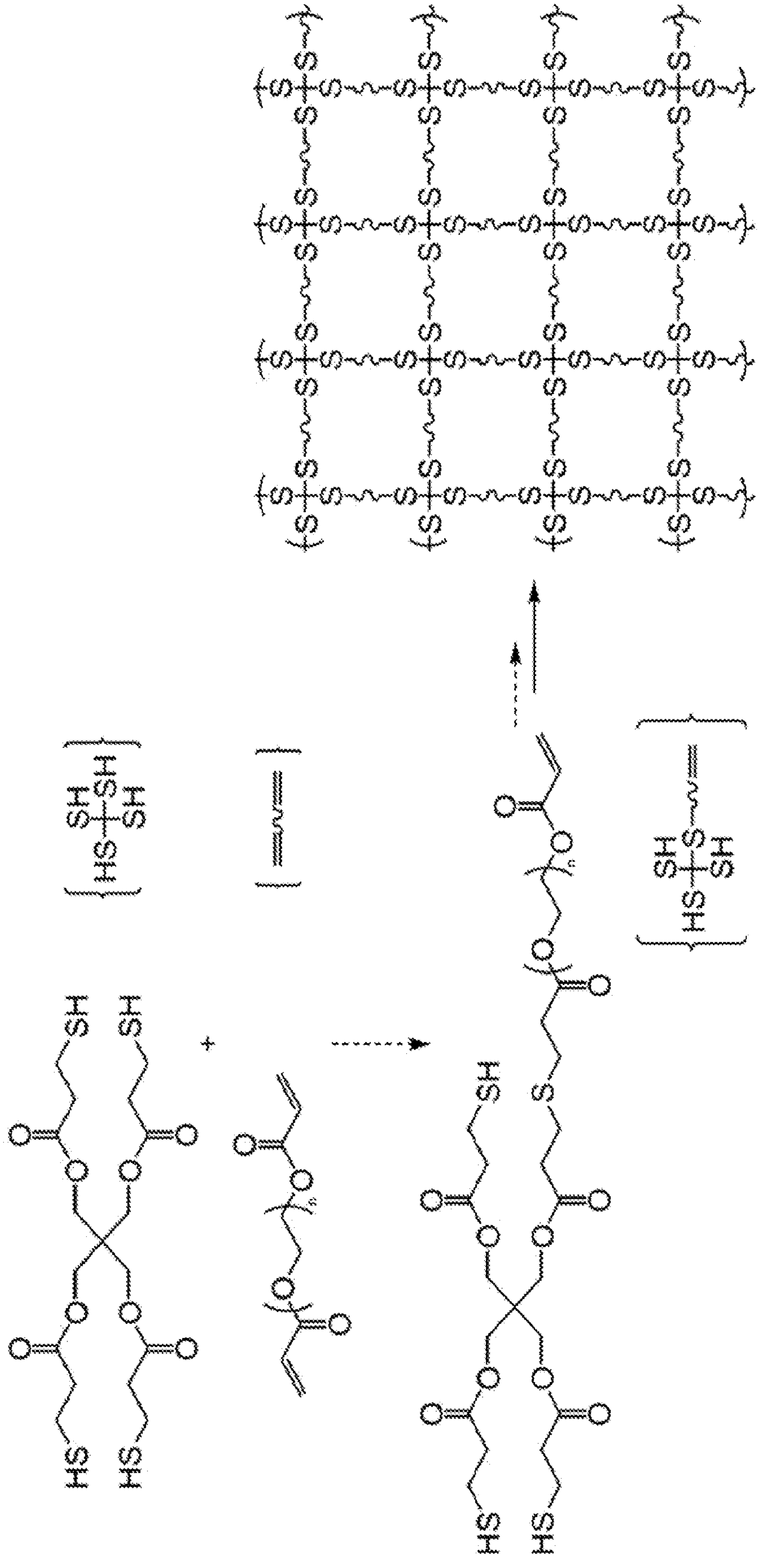
FIG. 3 is a schematic illustration of a crosslinking reaction of pentaerythritol tetrakis(3-mercaptopropionate) and PEG diacrylate according to an example of the present disclosure.

FIG. 3 is a reaction scheme showing, in one example, a thiol-ene reaction between PEG diacrylate, a first structural modifier, and pentaerythritol tetrakis(3-mercaptopropionate), a second structural modifier. Each PEG diacrylate molecule has two alkene functional groups. Each pentaerythritol tetrakis(3-mercaptopropionate) has four thiol groups. By reacting the thiol groups with the alkene groups using a thiol-ene reaction, a network can be formed.

Figure 4:
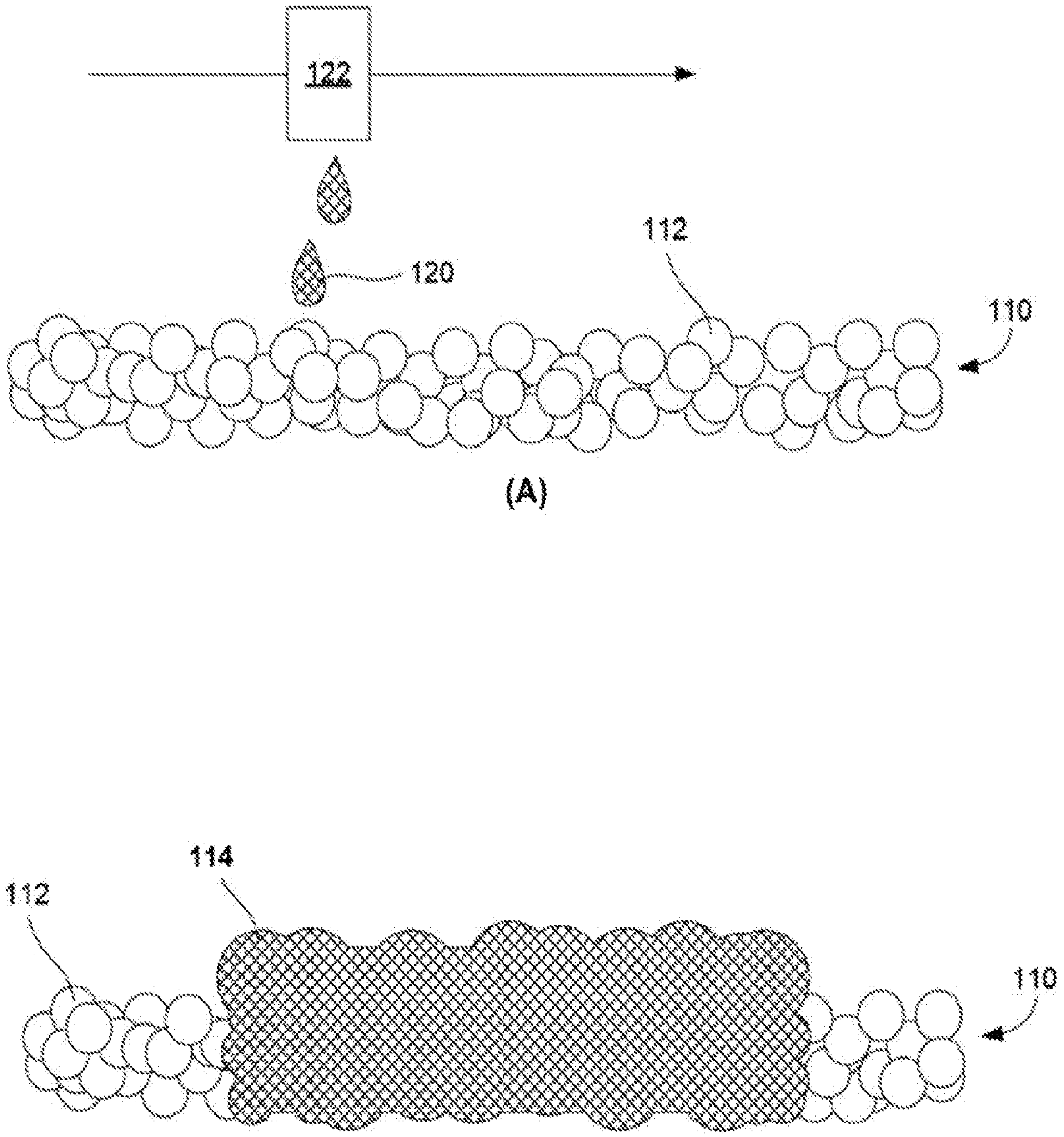
FIG. 4 shows schematic illustrations of a method of three-dimensional printing a hydrogel where a polyhydroxylated polymer in a particulate build material is crosslinked according to an example of the present disclosure.

FIG. 4 schematically shows part of a method of three-dimensional printing a hydrogel according to an example of the present disclosure.

In FIG. 4A, a crosslinking agent 120 is jetted onto a layer of particulate build material 110 made up of particles of a polyhydroxylated polymer 112. The crosslinking agent is jetted from a crosslinking agent ejector 122. The crosslinking agent ejector can move across the layer of particulate build material to selectively jet the crosslinking agent on areas that are to be crosslinked to become part of the final hydrogel.

FIG. 4B shows the layer of particulate build material 110 after the crosslinking agent has been jetted onto the powder bed. The crosslinking agent has been jetted in an area of the particulate build material layer that is to be crosslinked to become part of the final three-dimensional printed hydrogel. The crosslinking agent converts the dry particulate build material into a crosslinked hydrogel 114 having a first network. In this example, the polymer swells in the area where the crosslinking agent was jetted due to the polymer absorbing water from the crosslinking agent. As shown in the figure, this can result in a volume increase in the area where the crosslinking agent was jetted, where the hydrogel has a larger volume than the original volume of the layer of particulate build material.

Figure 5:
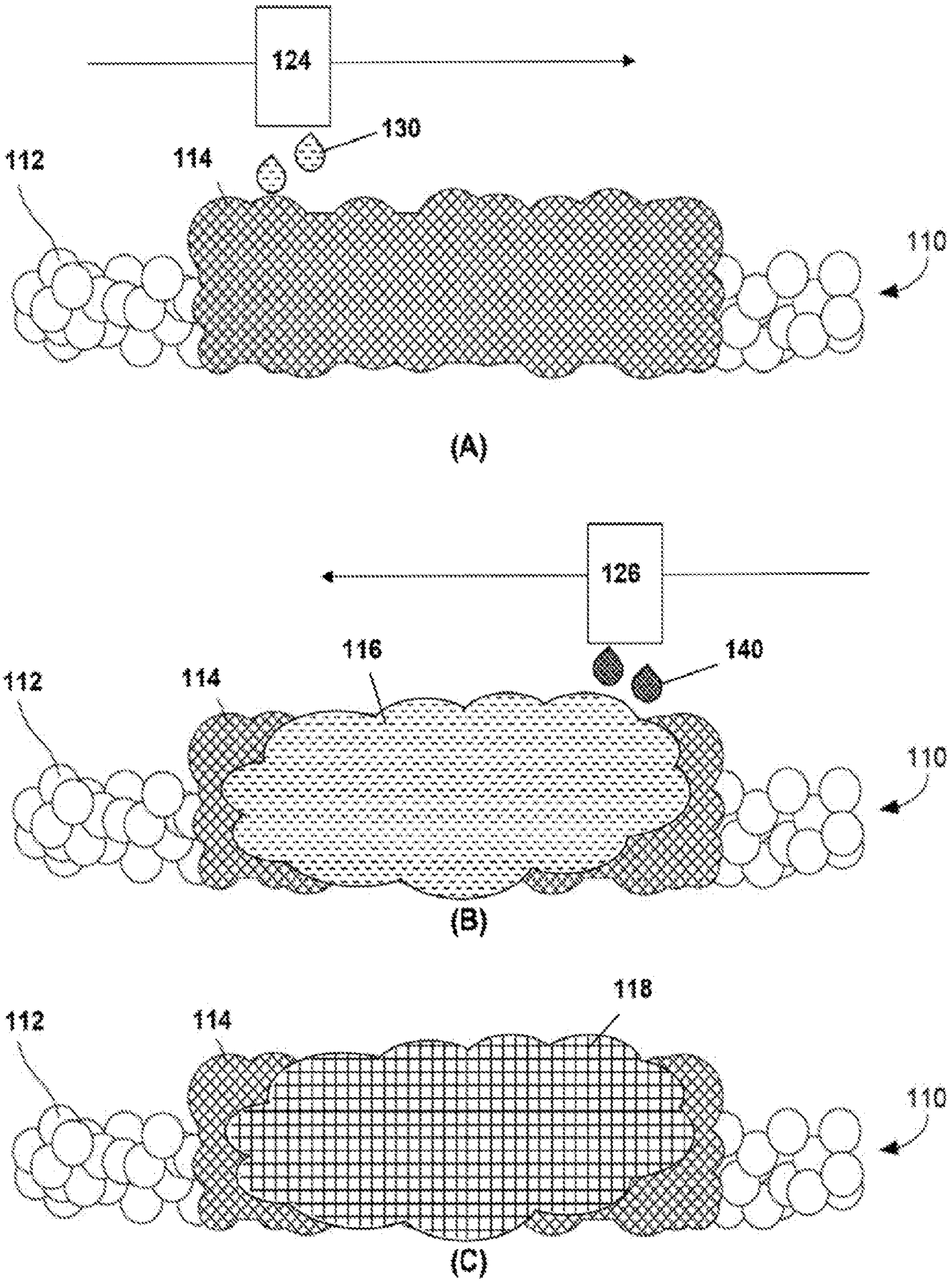
FIG. 5 shows schematic illustrations of a method of three-dimensional printing a hydrogel where a structural modifier is crosslinked according to an example of the present disclosure.

FIG. 5 follows on from FIG. 4, and schematically shows the remaining parts of a method of three-dimensional printing a hydrogel according to an example of the present disclosure.

In FIG. 5A, a first structural modifier 130 is jetted onto a layer of the crosslinked polyhydroxylated polymer 114 having a first network. The first structural modifier is jetted from a structural modifier ejector 124, which may or may not be the same as the crosslinking agent ejector 122. For illustrative purposes, the first structural modifier is selectively jetted onto a part of the crosslinked polyhydroxylated polymer to form a second network in a region of the final hydrogel.

FIG. 5B shows a formulation 140 comprising a second structural modifier and a reaction promoter being jetted onto a region 116 comprising both the crosslinked polyhydroxylated polymer and the first structural modifier.

FIG. 5C shows an area 118 of a hydrogel having an interpenetrating polymer network formed of a first network and a second network. Upon application of the reaction promoter and the second structural modifier, there is a reaction with the first structural modifier to form a second network. This second network only forms in the area where the first structural modifier, the second structural modifier and the reaction promoter applied. Thus, there is a remaining region 114 where only the crosslinked polyhydroxylated polymer is present. After 3D printing this layer of the hydrogel, an additional layer of particulate build material can be spread over the top of the previous layer. The additional layer can have a sufficient layer thickness that some particulate build material covers the hydrogel formed in the previous layer. The process of jetting the crosslinking agent, the structural modifiers and the reaction promoter onto the powder bed can then be repeated to form an area of hydrogel from the additional layer of particulate build material.

EXAMPLES

The present disclosure will now be illustrated by the following non-limiting examples.

Example 1—Crosslinking Agent

Sodium tetraborate was used as a crosslinking agent. A formulation was prepared comprising sodium tetraborate in an amount of 10 wt %, an organic co-solvent (propylene glycol) in an amount of 10 wt % a surfactant (Tergitol™ 15-S-12) in an amount of 0.8 wt %, and deionized water in an amount of 79.2 wt %.

The formulation containing the crosslinking agent was tested for jettability by being loaded into a two-dimensional inkjet printer. A cyan dye was added to the formulation to ensure that it was visible when printed. A test pattern was printed to evaluate nozzle health and decap of the inkjet printer when printing the crosslinking agent formulation.

The results showed excellent nozzle health and a decap of up to 16 seconds.

Example 2—3D Printed Hydrogel

The formulation of Example 1 was loaded into a three-dimensional printer that included a powder bed and an inkjet printhead for jetting the formulation onto the powder bed. The particulate build material used in the powder bed was a dry non-crosslinked polyvinyl alcohol powder. The layer height was set at 400 μm, meaning that when a fresh layer of particulate build material was spread onto the powder bed, the upper surface of the layer was 400 μm higher than the previous layer. The amount of formulation that was jetted onto the powder bed was varied between 50 and 100 droplets (having a weight of 9 ng per droplet) per square of $1/600^{th}$ inch by $1/600^{th}$ inch. This amount of formulation corresponded to a layer of liquid having a depth of 200-400 μm deposited onto the individual layers of particulate build material.

It was found that when the formulation containing the crosslinking agent was jetted onto a layer of particulate build material, the polyvinyl alcohol absorbed the water from the formulation and swelled to a greater volume. This caused the layer height to increase. When the next layer of dry particulate build material was spread over the powder bed, there was less space over the swelled area, so that the amount of powder added over that area was less than 400 μm deep. In some cases, there was space for about 40 μm of additional particulate build material over the top of the swelled area.

A series of sample hydrogel objects was printed using the test three-dimensional printer. The temperature of the powder bed was maintained at less than 37° C. during printing. As in Example 1, the formulation containing a crosslinking agent was tinted with a cyan dye to give the hydrogel a bright blue color.

The hydrogel objects were successfully printed and removed from the powder bed. White particles of dry polyvinyl alcohol powder were adhered to the surfaces of the hydrogel objects. To remove these particles, the hydrogel objects were submerged in water for several minutes. The un-crosslinked polyvinyl alcohol particles dissolved in the water, leaving the bright blue hydrogel objects.

The hydrogel objects were examined under magnification. The hydrogel objects had a relatively isotropic surface with no visible layer lines between the individual layers that were formed during three-dimensional printing.

These results demonstrate that hydrogels can be printed at relatively low temperatures and that the hydrogels can have a relatively high water content.

Example 3—3D Tinted Hydrogel Interpenetrating Polymer Network

A formulation comprising a crosslinking agent was prepared as set out in Table 1 below.

TABLE 1

| Crosslinker formulation | wt % |
|---|---|
| Sodium tetraborate | 5 |
| Cosolvent (propylene glycol) | 10 |
| Surfactant (Tergitol ™ 15-S-12) | 0.8 |
| Deionised water | 84.2 |

Structural modifier formulations were prepared as set out in Tables 2 and 3.

| Structural modifier formulation 1 | wt % |
|---|---|
| Pentaerythnitol tetrakis(3-mercaptopropionate) | 10 |
| Cosolvent (propylene glycol) | 10 |
| Surfactant (Tergitol ™ 15-S-12) | 0.8 |
| Radical initiator (2,2-dimethoxy-2-phenylacetophenone) | 1 |
| Deionised water | 78.2 |

TABLE 3

| Structural modifier formulation 2 | wt % |
|---|---|
| PEG diacrylate | 10 |
| Cosolvent (propylene glycol) | 10 |
| Surfactant (Tergitol ™ 15-S-12) | 0.8 |
| Deionised water | 78.2 |

Each of the formulations can be load into a three-dimensional printer that includes a powder bed and an inkjet printhead for jetting the formulations onto the powder bed. The particulate build material that can be used in the powder bed is a dry non-crosslinked polyvinyl alcohol powder, such as used in Example 2. The particulate build material can be spread onto the powder bed as a layer and then the crosslinking formulation can be jetted onto the powder bed, as in Example 2 to crosslink the polyvinyl alcohol polymer.

Structural modifier formulation 1 can then be jetted onto the powder bed containing the crosslinked polymer. After jetting this formulation onto the powder bed, structural modifier formulation 2 can then be jetted onto the powder bed. The polymer on the powder may then be irradiated with UV at 365 nm to promote radical crosslinking of the thiol group from the pentaerythritol tetrakis(3-mercaptopropionate) structural modifier and the alkene group of the PEG diacrylate structural modifier.

To replicate the three-dimensional printing of a hydrogel using the above particulate build material, crosslinker formulation and the structural modifier formulations 1 and 2, a bench test was performed using these components. The test sample leas irradiated with UV at 365 nm for 20 minutes to promote radical crosslinking.

The resulting hydrogel had an opaque appearance and was visibly different in appearance to the clear hydrogel of Example 2. It was also evident that the hydrogel had decreased mobility resulting from a more fixed and structurally rigid structure, when compared in a side-by-side comparison with the hydrogel of Example 2.

The invention claimed is:

1. A three-dimensional printing kit, comprising:

a particulate build material consisting of a polyhydroxylated polymer having hydroxyl groups and selected from the group consisting of polyvinyl alcohol, poly(2-hydroxyethyl acrylate), poly(2-hydroxyethyl methacrylate), poly(acrylic acid), poly(methacrylic acid), and a combination thereof;

a crosslinking agent for crosslinking the polyhydroxylated polymer by a reaction with the hydroxyl groups of the polyhydroxylated polymer to form a hydrogel; and a structural modifier agent that is separate from the particulate build material, the structural modifier agent consisting of a structural modifier, water, a co-solvent, and a surfactant, wherein the structural modifier:

has a plurality of functional groups that react to form a network within the hydrogel;

has a reactivity that is chemically orthogonal to the reaction of the hydroxyl groups of the polyhydroxylated polymer and the crosslinking agent for crosslinking the polyhydroxylated polymer to form the hydrogel; and is selected from the group consisting of ethylene glycol diacrylate, ethylene glycol dimethacrylate, diethylene glycol diacrylate, diethylene glycol dimethacrylate, dipropylene glycol diacrylate, dipropylene glycol dimethacrylate, poly(ethylene glycol) diacrylate, poly(ethylene glycol) dimethacrylate, trimethylolpropane triacrylate, glycerol triacrylate, trimethylolpropane ethoxylate triacrylate, 1,3,5-triacryloylhexahydro-1,3,5-triazine, tris-2-(acryloyloxy)ethyl isocyanurate, 1,3,5-triallyl-1,3,5-triazine-2,4,6(1H, 3H,5H)-trione, 2,4,6-triallyloxy-1,3,5-triazine, pentaerythritol tetraacrylate, and di(trimethylolpropane) tetraacrylate.

2. The three-dimensional printing kit of claim 1, wherein the crosslinking agent is reactive to form (a) hydrogen bonds, (b) ester groups, or (c) a metal ion coordination complex with the hydroxyl groups of polyhydroxylated polymers, and wherein the structural modifier is reactive to form the network by a thiol-ene reaction, Michael addition, a 1,3-dipolar cycloaddition, or a Diels-Alder reaction.

3. The three-dimensional printing kit of claim 1, further comprising a reaction promoter agent including a reaction promoter to initiate a reaction between the plurality of functional groups of the structural modifier.

4. The three-dimensional printing kit of claim 1, wherein:

the structural modifier agent is a first structural modifier agent and the three-dimensional printing kit further comprises a second structural modifier agent;

the structural modifier of the first structural modifier agent is a first structural modifier and the plurality of functional groups of the first structural modifier is a plurality of first functional groups;

the second structural modifier agent includes a second structural modifier having a plurality of second functional groups; and the plurality of first functional groups of the first structural modifier reacts with the plurality of second functional groups of the second structural modifier to form the network within the hydrogel.

5. The three-dimensional printing kit of claim 4, wherein the plurality of first functional groups of the first structural modifier is a plurality of alkene groups, and wherein the plurality of second functional groups of the second structural modifier is a plurality of alkene groups.

6. The three-dimensional printing kit of claim 4, wherein the plurality of first functional groups of the first structural modifier is two or more alkene groups, and wherein the plurality of second functional groups of the second structural modifier is three or more thiol groups.

7. The three-dimensional printing kit of claim 4, wherein the first structural modifier is poly(ethylene glycol) diacrylate and the second structural modifier is pentaerythritol tetrakis(3-mercaptopropionate).

8. The three-dimensional printing kit of claim 1, wherein the crosslinking agent is selected from the group consisting of sodium tetraborate, potassium tetraborate, and lithium tetraborate.

9. A three-dimensional printing kit, comprising:

a particulate build material comprising a polyhydroxylated polymer having hydroxyl groups and selected from the group consisting of polyvinyl alcohol, poly (2-hydroxyethyl acrylate), poly(2-hydroxyethyl methacrylate), poly(acrylic acid), poly(methacrylic acid), and a combination thereof;

a crosslinking agent for crosslinking the polyhydroxylated polymer by a reaction with the hydroxyl groups of the polyhydroxylated polymer to form a hydrogel;

a first jettable agent including water and a first structural modifier; and a second jettable agent separate from the first jettable agent, the second jettable agent consisting of water, a co-solvent, a surfactant, a radical initiator, and a second structural modifier, wherein:

each of the first and second structural modifiers has a plurality of functional groups that react to form a network within the hydrogel and has a reactivity that is chemically orthogonal to the reaction of the hydroxyl groups of the polyhydroxylated polymer and the crosslinking agent for crosslinking the polyhydroxylated polymer to form the hydrogel; and the second structural modifier is selected from the group consisting of 1,2-ethanedithiol, 1,3-propanedithiol, 1,4-butanedithiol, 1,5-pentadithiol, poly(ethylene glycol) dithiol, benzene-1,4-dithiol, benzene-1, 3-dithiol, propane-1,2,3-trithiol, trimethylolpropane tris(3-mercaptopropionate), tris[2-(3-mercaptopropionyloxy)ethyl] isocyanurate, pentraerythrityl tetrathiol, pentaerythritol tetrakis(3-mercaptopropionate), and pentaerythritol tetrakis(3-mercaptoacetate).

10. The three-dimensional printing kit of claim 9, wherein the first jettable agent further includes a co-solvent and a surfactant.

11. The three-dimensional printing kit of claim 9, wherein the first structural modifier has two or more alkene groups and the second structural modifier has two or more thiol groups.

12. A method of three-dimensional printing, the method comprising:

applying a layer of a particulate build material consisting of a polyhydroxylated polymer having hydroxyl groups and selected from the group consisting of polyvinyl alcohol, poly(2-hydroxyethyl acrylate), poly(2-hydroxyethyl methacrylate), poly(acrylic acid), poly (methacrylic acid), and a combination thereof;

applying a crosslinking agent onto the layer of the particulate build material;

reacting the crosslinking agent with the hydroxyl groups of the polyhydroxylated polymer to crosslink the polyhydroxylated polymer and form a hydrogel;

applying a structural modifier agent onto the layer of the particulate build material, the structural modifier agent consisting of a structural modifier, water, a co-solvent, and a surfactant, wherein the structural modifier:

has a plurality of functional groups; and is selected from the group consisting of ethylene glycol diacrylate, ethylene glycol dimethacrylate, diethylene glycol diacrylate, diethylene glycol dimethacrylate, dipropylene glycol diacrylate, dipropylene glycol dimethacrylate, poly(ethylene glycol) diacrylate, poly(ethylene glycol) dimethacrylate, trimethylolpropane triacrylate, glycerol triacrylate, trimethylolpropane ethoxylate triacrylate, 1,3,5-triacryloylhexahydro-1,3,5-triazine, tris-2-(acryloyloxy)ethyl isocyanurate, 1,3,5-triallyl-1,3,5-triazine-2,4,6(1H, 3H,5H)-trione, 2,4,6-triallyloxy-1,3,5-triazine, pentaerythritol tetraacrylate, and di(trimethylolpropane) tetraacrylate; and reacting the plurality of functional groups of the structural modifier to form a network within the hydrogel, the reaction of the plurality of functional groups of the structural modifier being chemically orthogonal to the reaction between the crosslinking agent and the hydroxyl groups of the polyhydroxylated polymer.

13. The method of three-dimensional printing of claim 12, further comprising applying a reaction promoter agent onto the layer of particulate build material, the reaction promoter agent including a reaction promoter to initiate a reaction between the plurality of functional groups of the structural modifier.

14. The method of three-dimensional printing of claim 12, wherein:

the structural modifier agent is a first structural modifier agent and the structural modifier having the plurality of functional groups is a first structural modifier having a plurality of first functional groups; and the method further comprises applying a second structural modifier agent onto the layer of the particulate build material, the second structural modifier agent including a second structural modifier having a plurality of second functional groups.

15. The method of three-dimensional printing of claim 14, wherein the first structural modifier having the plurality of first functional groups is a compound comprising a plurality of alkene groups, and wherein the second structural modifier having the plurality of second functional groups is a compound comprising a plurality of alkene groups.

16. The method of three-dimensional printing of claim 12, further comprising removing the crosslinking between the polyhydroxylated polymer by acidifying the hydrogel.

* * * * *